United States Patent
Sandwall et al.

(10) Patent No.: US 11,975,437 B2
(45) Date of Patent: May 7, 2024

(54) VIBRATION REDUCING HANDLE FOR EARLY ENTRY CONCRETE SAWS

(71) Applicant: HUSQVARNA AB, Huskvarna (SE)

(72) Inventors: Johan Sandwall, Gråbo (SE); Tobias Gustafsson, Gothenburg (SE); Eric Hulthe, Kállered (SE)

(73) Assignee: HUSQVARNA AB, Huskvarna (SE)

( * ) Notice: Subject to any disclaimer, the term of this patent is extended or adjusted under 35 U.S.C. 154(b) by 314 days.

(21) Appl. No.: 17/125,016

(22) Filed: Dec. 17, 2020

(65) Prior Publication Data
US 2021/0220984 A1 Jul. 22, 2021

(30) Foreign Application Priority Data
Jan. 16, 2020 (SE) .................................. 2050033-6

(51) Int. Cl.
*B25F 5/00* (2006.01)
*B28D 1/04* (2006.01)

(52) U.S. Cl.
CPC ............... *B25F 5/006* (2013.01); *B28D 1/04* (2013.01)

(58) Field of Classification Search
CPC .... F16B 7/182; F16B 2200/30; F16B 7/1445; B25F 5/02; B25F 5/006; A01D 34/416
See application file for complete search history.

(56) References Cited

U.S. PATENT DOCUMENTS

| 4,505,040 A * | 3/1985 | Everts ....................... B25F 3/00 |
| | | 30/296.1 |
| 2002/0064421 A1* | 5/2002 | Beaulieu ................. F16B 7/042 |
| | | 403/337 |
| 2006/0272130 A1* | 12/2006 | Togami ................... E01C 19/35 |
| | | 16/431 |
| 2018/0051472 A1 | 2/2018 | Grinwald |
| 2020/0056638 A1* | 2/2020 | Bianchi ................... F16B 7/182 |

FOREIGN PATENT DOCUMENTS

| GB | 2080921 A | 2/1982 |
| GB | 2553180 A | 2/2018 |

OTHER PUBLICATIONS

Swedish Office Action and Search Report for Swedish Application No. 2050033-6, dated Sep. 10, 2020.

* cited by examiner

*Primary Examiner* — Daniel Jeremy Leeds
(74) *Attorney, Agent, or Firm* — BURR & FORMAN LLP (57) ABSTRACT

A vibration suppressing handle arm (600) for an early entry concrete saw, the handle comprising a joint separating the handle into a first elongated part (120) and a second elongated part (140), wherein the first and second elongated parts are arranged pivotable with respect to each other about the joint, wherein the first part (120) has an elongation direction configured to align with an elongation direction of the second part (140) to form an elongation direction of the handle when the handle is in an unfolded position, the handle further comprising a resilient element arranged to resist but not prevent pivoting by the first elongated part (120) and the second elongated part (140) about the joint.

13 Claims, 7 Drawing Sheets

VIBRATION REDUCING HANDLE FOR EARLY ENTRY CONCRETE SAWS

TECHNICAL FIELD

The present disclosure relates to early entry concrete sawing. There are disclosed vibration reducing handles and methods for reducing vibration in early entry concrete saw handles. The handles and handle arms disclosed herein are applicable also to other work tools, such as floor saws and the like.

BACKGROUND

Early entry concrete sawing relates to the technique of cutting shallow cuts in concrete surfaces within the first one or two hours after finishing surface preparation, i.e., before the concrete has set, a period often referred to as the 'green zone'. The shallow cuts create a weakened surface plane, thus encouraging cracking to occur at the location of the cuts in a controlled manner rather than the cracks appearing anywhere in the concrete, resulting in a more visually appealing surface.

One example of early entry concrete saws are the Soff-Cut range of early entry concrete saw products manufactured by Husqvarna AB.

Early entry concrete sawing machines have been known for some time. Smaller models are often manually operated by means of a handle which an operator uses to guide and push the machine during operation. It is desired to minimize vibration in the handle in order to improve operator comfort and to avoid damage to the machine.

US 2008/0289842 A1 discloses a vibration dampening handle for power tools.

JP 2018071201 discloses a vibrocompactor arranged to reduce vibration transmitted to a worker.

However, the known solutions to reduce handle vibration are relatively complex and may not be optimal in terms of efficiency. There is a need for more cost efficient and effective vibration suppressing handles.

SUMMARY

It is an object of the present disclosure to provide vibration reducing handles and handle arms for early entry concrete saws. This object is obtained by a vibration suppressing handle arm for an early entry concrete saw. The handle arm comprises a joint separating the handle arm into a first elongated part and a second elongated part. The first and second elongated parts are arranged pivotable with respect to each other about the joint. The first part has an elongation direction configured to align with an elongation direction of the second part to form an elongation direction of the handle arm when the handle arm is in an unfolded position. The handle arm further comprises a resilient element arranged to resist but not prevent pivoting by the first elongated part and the second elongated part about the joint by exerting a force directed transversal to the elongation direction of the handle arm, thereby reducing vibration in the handle arm.

This way a cost effective yet effective vibration suppression is obtained in a mechanically robust manner. The handle arm is easily foldable into a folded position by disengaging the resilient element to allow pivoting into the folded position. The vibration suppression mechanism is mechanically durable and easy to engage.

According to aspects, the resilient element is arranged to exert a force directed transversal to the elongation direction of the handle arm in response to pivoting by the first elongated part and the second elongated part about the joint. As will be explained in the following, this type of directive force can be generated in a relatively straight forward manner, as opposed to known vibration suppression mechanisms based on torque or torsion resisting forces generated internally in a handle joint or hinge.

According to aspects, the first and second elongated parts are at least partly overlapping in the elongation direction of the handle arm when the handle arm is in the unfolded position. This overlap provides increased mechanical strength and simplifies generating the force directed transversal to the elongation direction of the handle arm.

According to aspects, the joint comprises a shaft arranged in a through-hole extending through end portions of the first and second elongated parts. The first elongated part and the second elongated part are arranged to contact each other solely by the shaft when the handle arm is resting in the unfolded position. Thus, contact between then first and second elongated part is minimized, which means that only a minimum of vibration is transmitted between the parts. The shaft and through hole arrangement constitute a hinge mechanism which is mechanically rigid in directions other than the pivoting direction, which is an advantage.

According to aspects, the resilient element is releasably arranged to allow folding of the handle into a folded position. Thus, convenient folding of the handle is enabled by simply releasing the resilient element, which is an advantage.

According to aspects, the first elongated part comprises a heel arranged to abut against an abutment surface of the second elongated part, whereby the heel and abutment surface provides an end-point of the pivoting as the handle is pressed downwards towards a ground surface. This heel and abutment surface arrangement provides an end point to the pivoting motion. When the heel abuts against the abutment surface, rigid contact between the parts is obtained. Thus, the saw can easily be lifted from the ground by pressing the handle downwards towards the ground.

According to aspects, the heel and the abutment surface are arranged at an angle with respect to each other, whereby a space is formed between the heel and the abutment surface when the handle is resting in the unfolded position. Thus, when the handle is in the resting position, contact between the first and second part is via the joint only. A measure of pivoting is allowed before the heel contacts the abutment surface.

According to aspects, the handle arm comprises a locking pin releasably arranged in a through-hole extending through end portions of the first and second elongated parts, whereby the locking pin is arranged to prevent folding of the handle arm into the folded position.

The locking pin provides an additional safety measure which prevents unwanted folding of the handle into the folded position.

According to aspects, the locking pin comprises a rigid center shaft. The resilient element is then applied as a resilient material coating on the rigid center shaft. This way the locking pin and resilient element is integrally formed. Vibration dampening is obtained by simply inserting the locking pin into the through-hole. This type of resilient element can be combined with other types of resilient elements to obtain additional resilience to resist the pivoting motion.

According to aspects, the resilient element comprises first and second opposing jaws arranged to clamp against opposite sides of the handle arm and to extend on either side of the joint in the elongation direction of the handle. At least one of the jaws comprises a resilient layer arranged to face the handle arm surface.

The jaws provide both mechanical stability and efficient vibration reduction in a cost efficient and durable manner, which is an advantage.

According to aspects, the resilient element is arranged to be released by a knob or wingnut and a threaded member arranged extending through the first and second opposing jaws and through the handle arm.

This way the resilient element can be conveniently released, and the handle can be folded into the folded position.

According to aspects, one of the first and second elongated parts comprises a slot extending in the elongation direction of the elongated part, where the first and second opposing jaws are slidably arranged in the slot, at least when the resilient element is in an unclamped position.

The slot provides a guide such that the vibration dampening mechanism can be slided into place to lock the handle arm first and second parts in the unfolded position. The mechanism can also be slided back from the joint to disengage the resilient element and the handle can then be folded in a convenient manner. The mechanism need not be separated from the handle arm at any point, which is an advantage, since this makes it more difficult to lose one or more parts of the handle arrangement.

According to aspects, the resilient element comprises a helical spring arranged attached at opposite ends to the first elongated part and to the second elongated part.

The helical spring provides for efficient vibration reduction. The helical spring can also be adapted to particular use cases, i.e., different types of engines and different types of concrete saw blades, which is an advantage.

According to aspects, the resilient element comprises a first left spring and an opposing second leaf spring attached to one of the first and second elongated parts and arranged to rest against opposite sides of the other of the first and second elongated parts when the handle is in the extended position.

The leaf springs represent another efficient means to realize a resilient element which suppresses handle vibration according to the teachings herein.

According to aspects, one of the first and second elongated parts comprises a slot extending in the elongation direction of the elongated part. The first and second leaf springs are slidably arranged in the slot. This way, the leaf spring arrangement is arranged slidable in the slot in a manner similar to the opposing jaws discussed above, thereby obtaining the same advantages mentioned above.

The resilient element comprising the leaf springs may optionally comprise a snap-lock mechanism arranged to hold the leaf springs in position when the handle is in the unfolded position.

There are also disclosed herein early entry concrete saws and methods associated with the advantages mentioned above.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
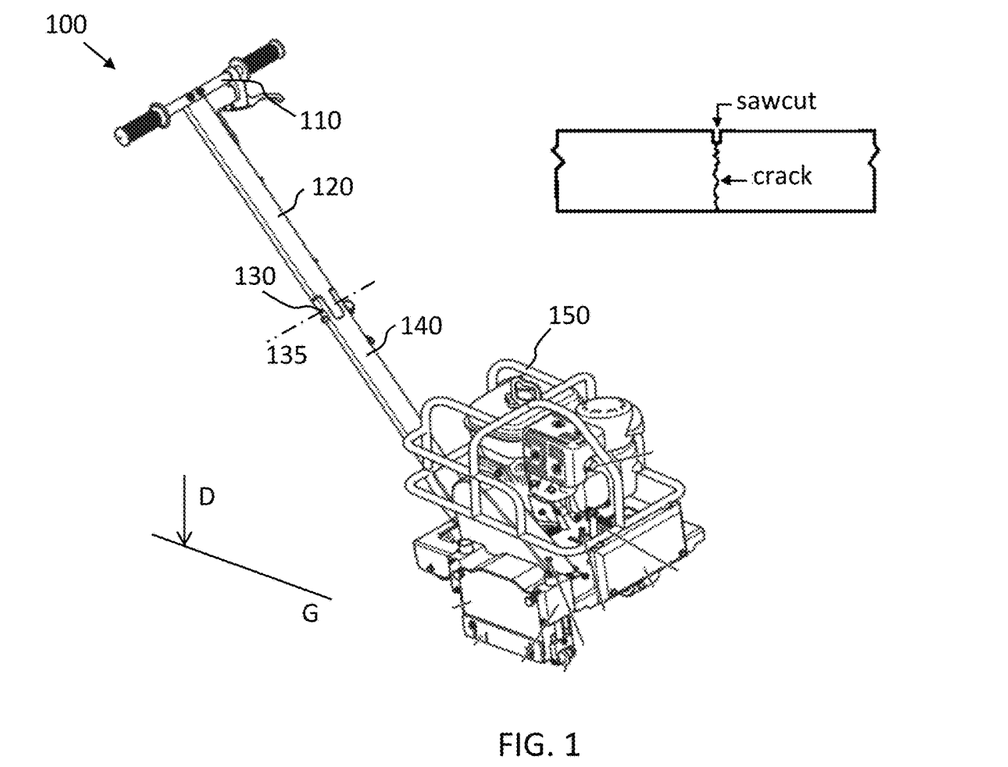
FIGS. 1-2 show example early entry concrete saws.

FIG. 1 illustrates an early entry concrete saw 100. As mentioned above, this type of saw is used to cut shallow cuts in concrete surfaces after finishing surface preparation, but before the concrete has set completely. The shallow cuts act as guides for cracks in the concrete, as shown in the inset of FIG. 1. A crack will normally start at the weakening in the concrete surface caused by the sawcut and work its way down. This way, the cracks will not be visible since they will be 'concealed' by the straight shallow cuts, thereby providing a more visually appealing surface.

The saw 100 comprises a handle-bar 110 which the operator uses for guiding and pushing the saw along the line to be cut. The handle-bar is attached to the machine 150 via a handle arm. The handle arm comprises a first part 120 and a second part 140, separated longitudinally by a joint 130 which allows the two parts to pivot with respect to each other about a pivoting axis 135.

Figure 2:
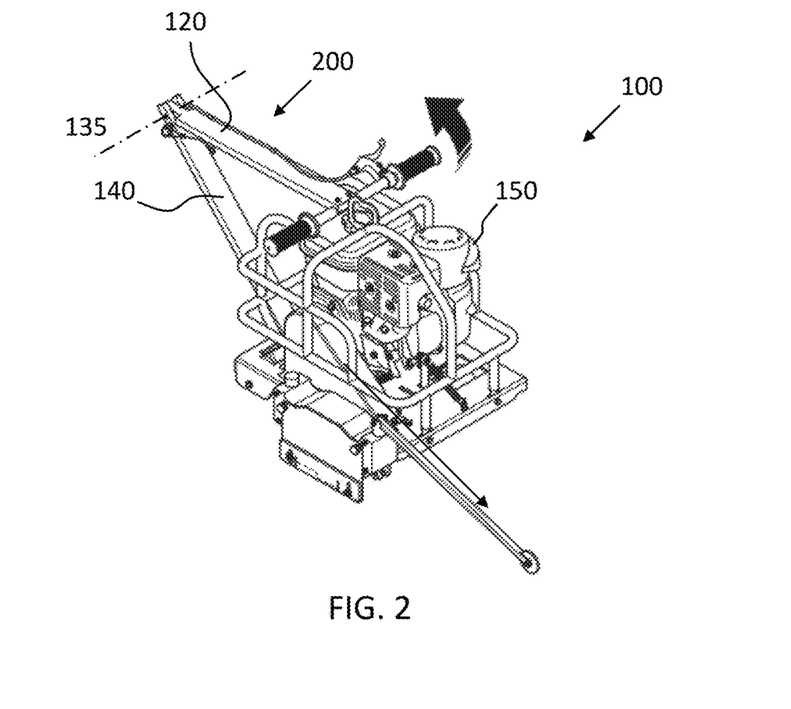

The pivoting of the two parts allows an operator to fold the first part 120 towards the body of the machine 150, as illustrated in FIG. 2. Thus, the handle arm on the concrete saw shown in FIGS. 1 and 2 can be arranged in an unfolded position which is used during operation (shown in FIG. 1), and also in a folded position 200 which can be used during, e.g., transport and storage of the machine (shown in FIG. 2). Normally, the first part and the second part are fixed in relation to each other when the handle arm is in the unfolded position.

Notably, then handle arm forms a continuous elongated arm when in the unfolded position, where the joint is integrated into the first and second parts.

A potential issue with early entry concrete saws, such as the concrete saw 100 shown in FIGS. 1 and 2, are the vibrations which are generated by the engine used to power the saw and to some extent also by the blade as it cuts into the concrete. These vibrations tend to propagate into the handle where they may cause operator discomfort.

To suppress the vibrations in the handle, a vibration suppressing handle arm is disclosed herein. The handle arm effectively suppresses vibrations by a resilient element that is arranged in connection to the joint, where it is arranged to resist but not to prevent the pivoting motion of the first and second handle arm parts. The resilient element also positions the two parts of the handle arm to have a minimum of metal contact when resting in the unfolded position, which reduces the amount of vibration transmitted between the parts.

Differently from the known vibration reducing handles disclosed, e.g., in US 2008/0289842 A1 and in JP 2018071201, the present disclosure teaches vibration reducing handles and handle arms which supress vibration by means of a resilient element arranged in connection to a joint or hinge mechanism between the first and the second elongated handle arm parts. The resilient element generates a resistive force in directed transversally to the elongation direction of the handle arm. Thus, a vibration having an amplitude measured transversal to the elongation direction E of the handle arm is efficiently suppressed in a cost-effective manner by the resilient element. Notably, the resilient element is not integrated or fixed with the hinge mechanism itself as in known vibration reducing handles. Rather, the resilient element is arranged separate from the joint, or distanced from the joint, and arranged protruding in a direction transversal to the elongation direction of the handle arm. This means that a simple hinge mechanism based on a shaft arranged in a through hole can be used instead of more advanced hinge mechanisms comprising torsion resistant members or the like. Also, the resilient elements disclosed herein are arranged to generate a linear force to suppress vibration, rather than generating a resistive torque to suppress vibration as in US 2008/0289842 A1 and in JP 2018071201.

Figure 3:
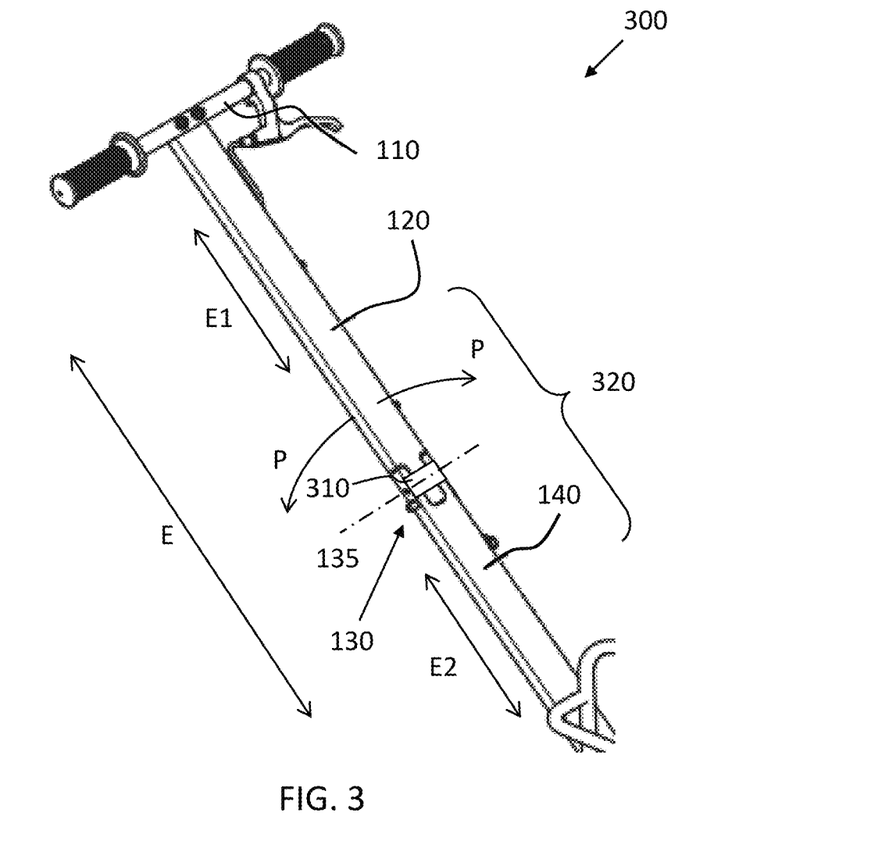
FIG. 3 illustrates an example vibration reducing handle arm.

FIG. 3 schematically illustrates some of the main concepts disclosed herein. There is shown a vibration suppressing handle arm 300 for an early entry concrete saw, such as the saw 100 discussed above in connection to FIGS. 1 and 2. The handle arm comprises a joint 130 separating the handle arm into a first elongated part 120 and a second elongated part 140. The elongated parts in FIG. 3 have rectangular cross-sections, but the ideas herein can be used with a wide variety of handle arm shapes.

The first and second elongated parts are arranged pivotable P with respect to each other about the joint 130. This means that the two parts may flex with respect to each other as illustrated in FIG. 3 by the curved arrows P. Each part is connected to the joint at a respective end portion. The axis 135 about which the two parts pivot is indicated in FIG. 3.

The first part 120 has an elongation direction E1 configured to align with an elongation direction E2 of the second part 140 to form an elongation direction E of the handle arm when the handle arm is in the unfolded position, i.e., the position that is used during operation.

To suppress vibrations, the handle arm comprises a resilient element 310 (only schematically illustrated in FIG. 3) arranged to resist but not to prevent pivoting by the first elongated part 120 and the second elongated part 140 about the joint 130 by exerting a resistive force in a direction transversal to the elongation direction E of the handle arm.

The resistance is achieved by exerting a force on the first and second elongated parts that is transversal to the elongation direction E of the handle arm when the handle arm is in the unfolded position. This transversal force can be generated in a number of different ways, some of which will be described below. When the handle arm is arranged unfolded and in a resting position, there will be no significant transversal force exerted by the resilient element. However, when the handle arm is bent about the joint or hinge mechanism 130, the resilient element will be deformed, which deformation will generate the transversal force in resistance to the pivoting motion. Notably, the resilient element is distanced from the actual joint or hinge mechanism, i.e., not comprised in the joint or hinge mechanism as in the known vibration reducing handles.

By not totally preventing the pivoting motion and instead allowing some small measure of pivoting motion, vibration may be absorbed by the resilient element, as opposed to a rigid connection between the first and the second elongated parts. The amount of pivoting allowed when the handle is in the unfolded position may be limited by a stop mechanism which will be discussed in more detail below in connection to FIG. 13.

Figure 4:
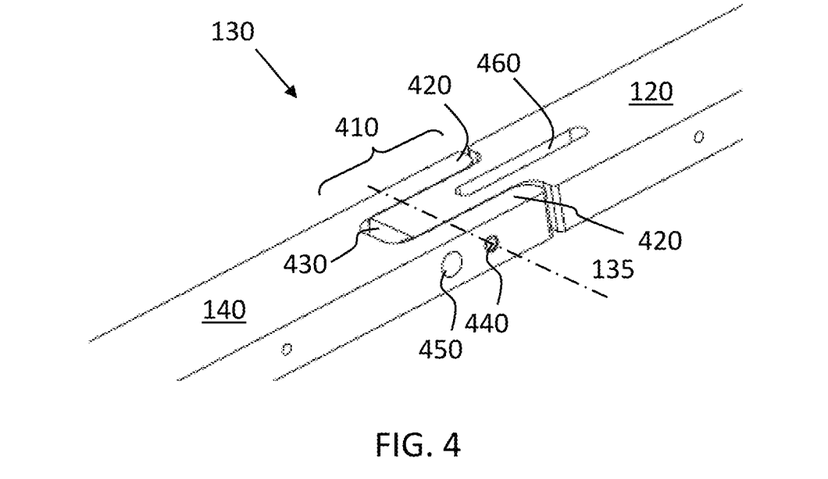
FIG. 4 shows details of a handle joint/hinge.

FIG. 4 illustrates details of an example joint 130. In this example, the first and second elongated parts 120, 140 are at least partly overlapping 410 in the elongation direction E of the handle arm when the handle arm 300 is in the unfolded position, i.e., the position shown in FIG. 1. The first elongated part 140 here comprises protruding portions extending from the end portion of the first part in the elongation direction. The second elongated part 140 has a complementary shape to the first part, which here means that the second elongated part 140 has a single central protrusion 430 extending from the end portion of the part in the elongation direction. The complementary shape can of course also take on other forms, comprising one or more protruding portions. The shape is complementary in the sense that the central protruding portion is received between the protrusions of the first elongated part.

The actual joint 130 may comprise a shaft 440 arranged in a through-hole extending through the end portions 420, 430 of the first and second elongated parts 120, 140. Advantageously, the joint does not protrude in any direction transversal to the elongation direction E but is flush or at least close to flush with the handle arm. A joint comprising a shaft arranged in a through-hole is an example of a hinge mechanism. This type of hinge mechanism can be manufactured cost efficiently but is still relatively stable with small play in directions other than the pivoting direction, which is an advantage.

According to some aspects, the first elongated part 120 and the second elongated part 140 are arranged to contact each other solely by the shaft 440 in the through-hole when the handle arm is resting in the unfolded position. This way a minimum of vibration is transmitted from the second elongated part 140 to the first elongated part 120, since the amount of metal contact between the two parts is limited.

FIG. 4 also illustrates an optional locking pin 450 releasably arranged in a through-hole extending through end portions 420, 430 of the first and second elongated parts 120, 140. This locking pin is arranged to prevent folding the handle arm into the folded position. Thus, the handle arm can be unfolded from the folded position 200, and then secured in the unfolded position.

The locking pin is optionally formed with a diameter smaller than the through-hole to allow some play, whereby substantial vibrations are not transmitted between first and second elongated parts via the locking pin 450.

Figure 16:
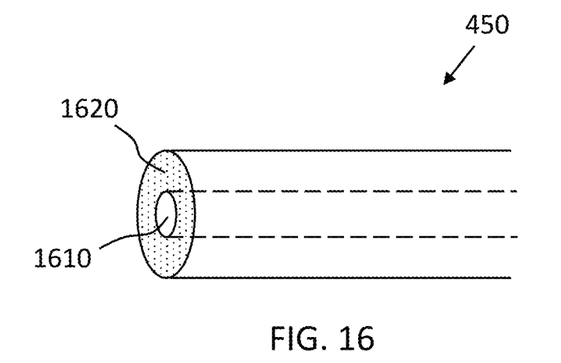
FIG. 16 illustrates details of a locking pin.

With reference to FIG. 16, the locking pin 450 optionally comprises a rigid center shaft 1610. The resilient element 310 may then be applied as a resilient material coating 1620 on the rigid center shaft 1610. The locking pin 450 need not necessarily have a circular cross-section, rectangular or square cross-sections are for instance also possible. In this case the resilient material coating need not be applied on all sides of the rectangular or square cross-section locking pin 450. This type of resilient element can be combined with other types of resilient elements disclosed herein.

The example joint 130 shown in FIG. 4 also comprises a slot 460 extending in the elongation direction of the second elongated part 140. This slot is a guiding mechanism for guiding the resilient element for sliding along the handle arm in the elongation direction. It will be discussed in more detail below.

Figure 5:
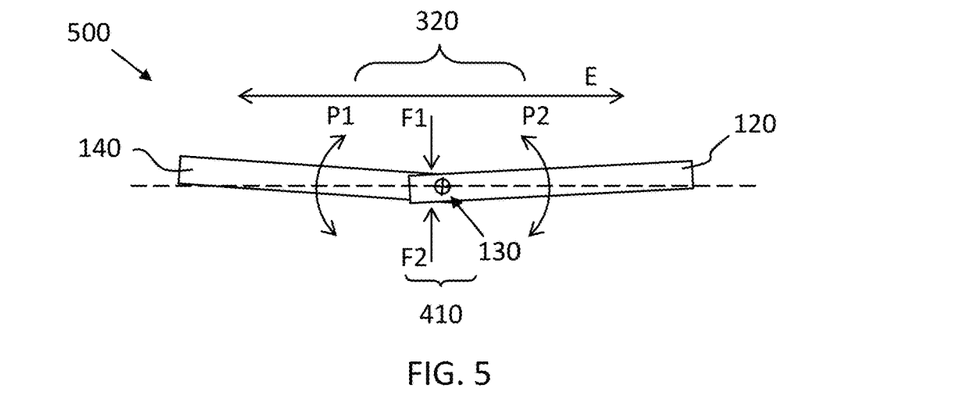
FIG. 5 illustrates pivotable handle arm parts.

FIG. 5 schematically illustrates an example handle arm structure 500 comprising the first and the second elongated parts arranged pivotable about a joint 130. The two parts may pivot about their end points as shown in FIG. by the arrows P1 and P2. It is appreciated that the pivoting motion can be resisted by application of a resistive force in vicinity of the joint 130.

Thus, according to aspects, the resilient element 310 is arranged to exert a force F1, F2 directed transversally to the elongation direction E of the handle arm in response to pivoting by the first elongated part 120 and the second elongated part 140 about the joint 130. Note that, herein, transversal does not necessarily equate orthogonal.

One example of such a resistive force is if two resilient planar elements are used to clamp against opposite sides of the handle arm about the location of the joint 130. A pivoting motion then deforms the resilient planar elements (since the handle arm bends about the joint), whereupon the resilient elements resist the pivoting. The deformation is increased if the end portions of the parts are at least partly overlapping 410. An example of this type of resilient element will be discussed below in connection to FIGS. 6-10.

Another example of a resilient element arranged to resist but not totally prevent the pivoting motion is a helical spring attached to both elongated parts. A pivoting motion will then deform the helical spring, which causes a force that resists the pivoting motion. An example of this type of resilient element will be discussed below in connection to FIG. 11.

Leaf springs can also be used with similar effect. An example of a resilient element arranged to resist but not to prevent pivoting which is based on leaf springs will be discussed below in connection to FIG. 12 and also FIG. 17.

For all three examples, a deformation of the resilient element causes a resistive force that counteracts the pivoting motion by exerting a force F1, F2 on the first and second elongated parts transversal to the elongation direction E of the handle arm when the handle arm is in the unfolded position. Notably, this linear force is different from a torque which resists rotation as is known from the prior art cited above.

For all three examples, the resilient element 310 may be releasably arranged to allow folding of the handle arm into a folded position 200. This means that the resilient element has one position in which it resists pivoting motion by the first and the second elongated parts (and prevents folding of the first and second parts), and another position in which the resilient element has been released to allow folding of the handle arm as shown in FIG. 2. Release may for example be achieved by means of a knob, wingnut, or snap mechanism.

For all three examples, the resilient element 310 is arranged transversal to the elongation direction E1, E2 of at least one of the first 120 and second 140 elongated parts. This means that the arrangement which comprises the resilient element 310 configured to resist pivoting of the first and second elongated parts protrudes from the handle arm in a direction transversal to the elongation direction E of the handle arm when the handle arm is in the unfolded position. This transversal arrangement allows the resilient element to resist pivoting in an efficient manner.

The vibration suppressing abilities of a resilient element arranged in connection to a joint depends to some extend on the location along the handle arm where the joint is arranged. A joint located centrally on the handle in the elongation direction normally performs better than a joint located closer towards one of the two ends of the handle, i.e., close to the machine 150 or close to the handlebars 110. According to some aspects, the joint 130 is located somewhere in a middle section 320 of the handle. The middle section extends up to one third of the total handle length and is centered on the handle in the extension direction E of the handle arm. It is appreciated that the joint 130 being located in the middle section does not necessarily mean that the joint is centered on the handle arm, rather, the joint can be located anywhere within the middle section to either side of a center location on the handle arm.

FIG. 5 shows an example middle section 320 which extends about one third of the overall length of the handle. The middle section is also centered on the handle in the elongation direction, which means that the part of the handle extending to one side of the middle section and the part of the handle extending to the other side of the middle section are about the same length.

FIGS. 6-10 illustrate the example arrangement mentioned above comprising two resilient planar elements, or jaws, that are used to clamp against opposite sides of the handle arm about the location of the joint 130. Thus, the jaws are used as a splint to hold the handle arm in the unfolded position. However, a measure of pivoting of the first and second parts is still allowed, but resisted by the jaws, which resistance absorbs vibration in the handle arm.

Figure 6:
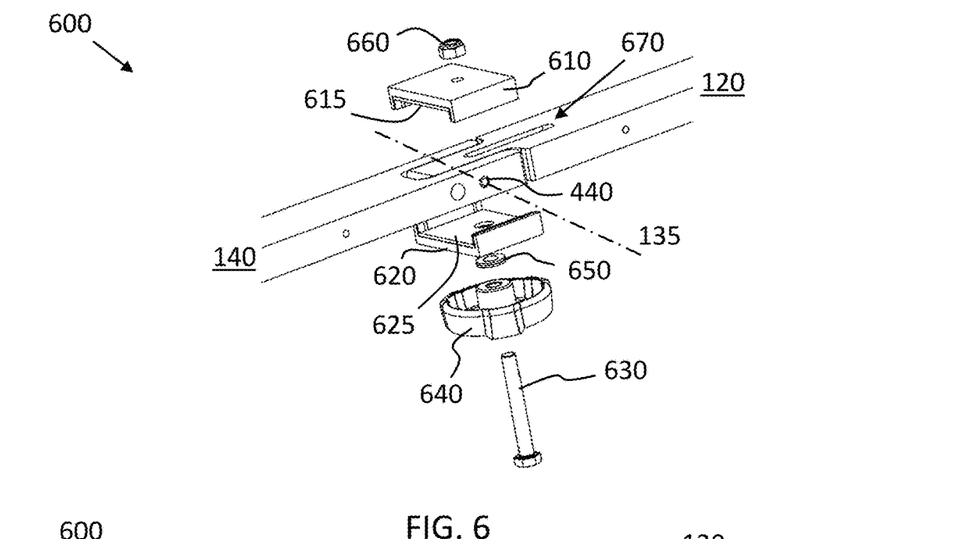
FIGS. 6-10 show an example vibration reducing arrangement.

FIG. 6 shows an exploded view of a resilient element 600 comprising first 610 and second 620 opposing jaws arranged to clamp against opposite sides of the handle arm and to extend on either side of the joint 130 in the elongation direction E of the handle arm, wherein at least one of the jaws 610, 620 comprises a resilient layer 615, 625 arranged to face the handle arm.

According to some aspects, the resilient element 310 is arranged to be released by a knob 640 and a threaded member 630 arranged extending through the first 610 and second 620 opposing jaws and through a slot 670 formed in the handle arm 600. The threaded member preferably comprises a threaded portion configured to mate with a threaded hole in the first jaw 610. A locking washer 650 may be arranged in between the knob 640 and the second jaw 620 to prevent an unwanted self-release of the resilient member 600 due to vibration. A lock nut 660 or other type of stopping element may optionally be arranged at a distal end of the threaded member, to prevent the arrangement separating from the handle arm.

A wingnut or the like can of course be used instead of the knob.

Figure 7:
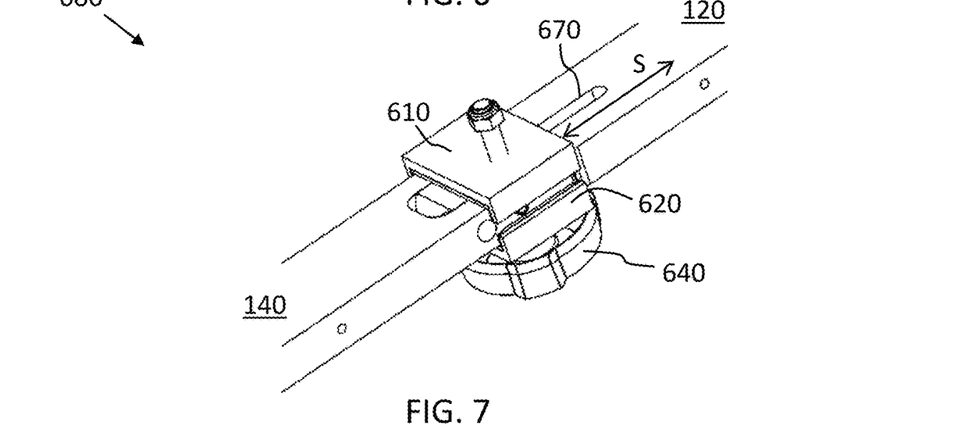

FIG. 7 shows an assembled view of the resilient element 600. Optionally, one of the first 120 and second 140 elongated parts comprises a slot 670 extending in the elongation direction E1, E2 of the elongated part. The first 610 and second 620 opposing jaws are slidably arranged S in the slot, when the resilient element 310 is in an unclamped position. This means that the resilient element 600 can be released by means of the knob 640 and threaded member 630, and then slid along and guided by the slot away from the joint to a position where the handle arm may be folded as shown in FIG. 2.

In other words, according to some aspects, in a first position of the resilient element 310 along the slot 670, the handle arm is locked in the unfolded position, and, in a second position of the resilient element 310 along the slot 670, the handle arm is foldable into the folded position 200.

Figure 8:
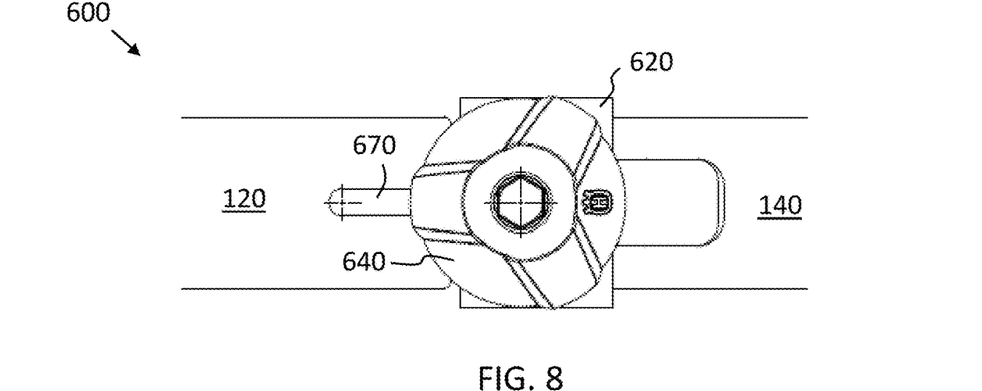
Figure 9:
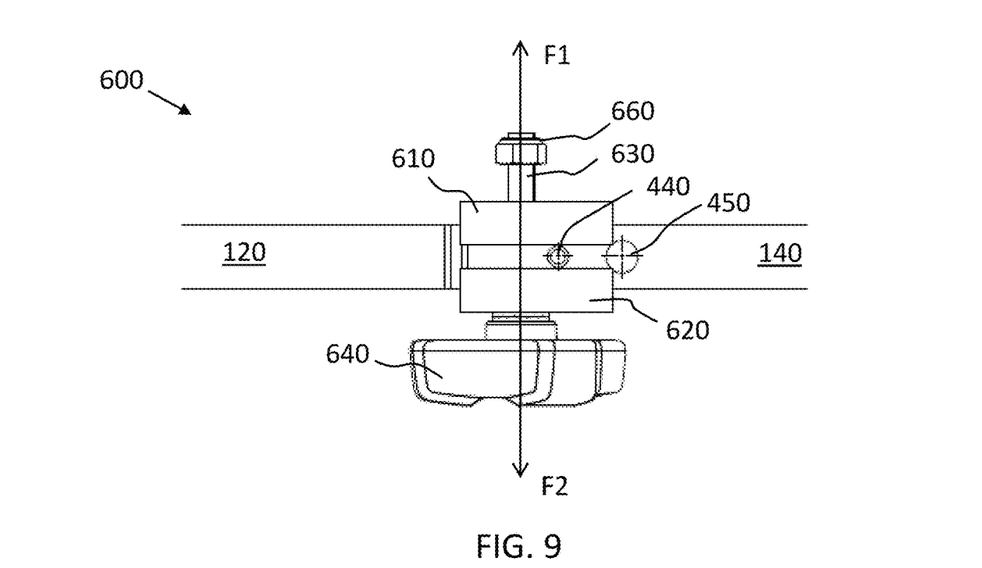
Figure 10:
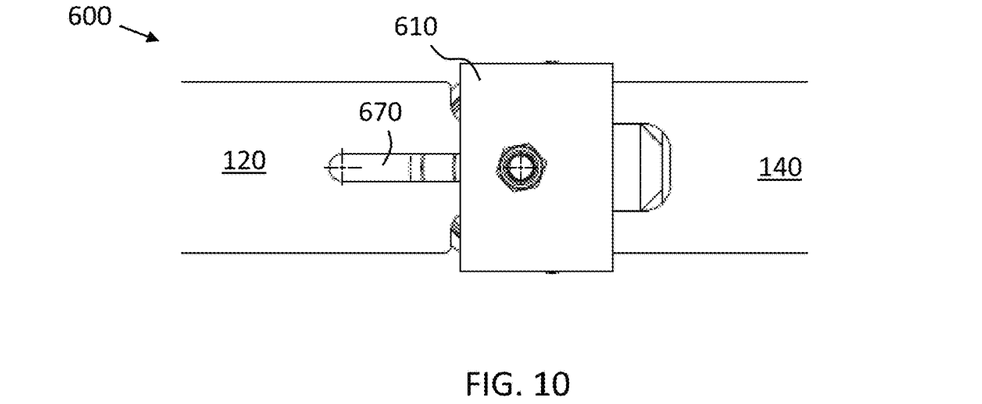

FIGS. 8, 9, and 10 show top, side, and bottom views, respectively, of the resilient element 600 discussed in connection to FIGS. 6 and 7. From these figures it is appreciated that the two opposing jaws, when in the clamped position, acts as a splint to the handle arm, thus resisting bending about the joint 130. The resilient layers 615, 625 deform as the handle arm is bent, i.e., as the first and second elongated parts pivot with respect to each other. This deformation generates a force which acts transversal to the elongation direction and resists the bending of the handle arm, thereby absorbing handle vibration.

Figure 11:
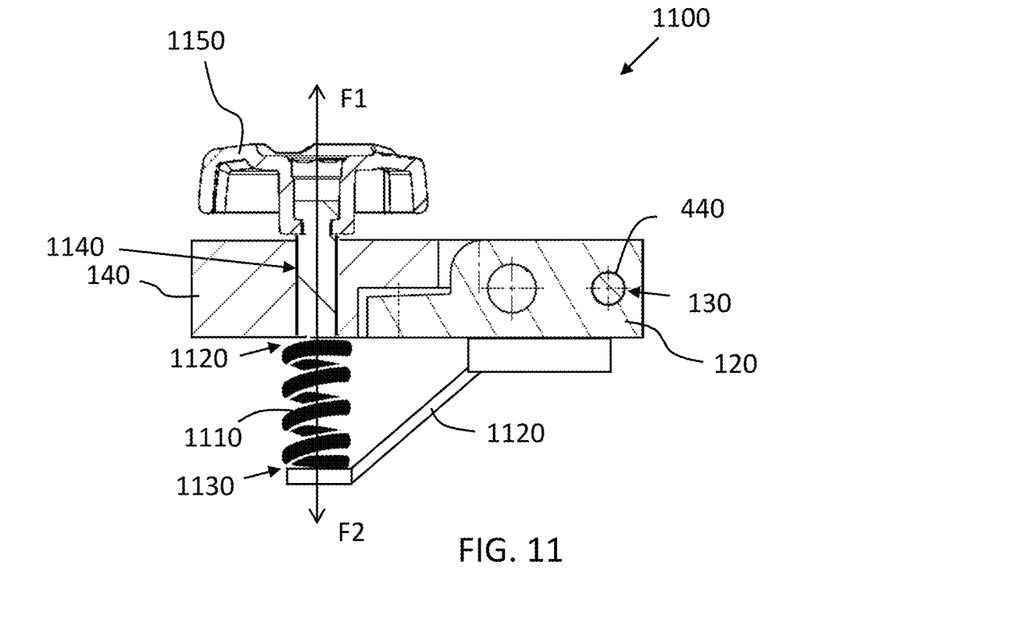
FIG. 11 shows another example vibration reducing arrangement.

FIG. 11 shows another example of a vibration suppressing handle arm 1100 comprising a resilient element which is arranged to resist pivoting by the first elongated part 120 and the second elongated part 140 about the joint or hinge mechanism 130 by exerting a force F1, F2 on the first and second elongated parts transversal to the elongation direction E of the handle arm when the handle arm is in the unfolded position.

According to this example, the resilient element comprises a helical spring 1110 arranged attached at opposite ends 1120, 1130 of the spring to the first elongated part 120 and to the second elongated part 140. The helical spring 1110 is attached on one end 1130 to the first elongated part 120 by a bracket 1120, and to the second elongated part by a threaded fastener 1140 preferable comprising a knob 1150 or a wingnut or the like. The threaded fastener 1140 comprises a threaded portion arranged to mate with a threaded member connected to an end 1120 of the helical spring 1110.

Thus, as the handle arm 300 bends, the helical spring 1110 is either compressed (which generates a force F1 in response) or extended (which generates a force F2 in response). This way pivoting of the first and second part is resisted but not prevented entirely.

Figure 12:
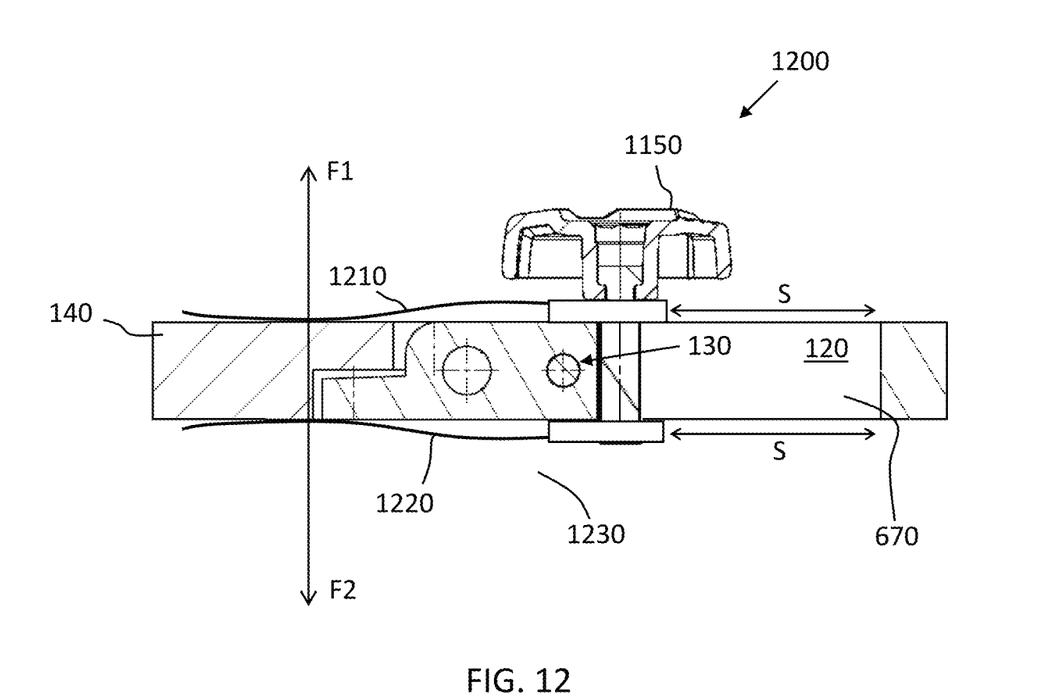
FIG. 12 shows yet another example vibration reducing arrangement.

FIG. 12 shows yet another example of a vibration suppressing handle arm 1200 comprising a resilient element which is arranged to resist pivoting by the first elongated part 120 and the second elongated part 140 about the joint 130 by exerting a force on the first and second elongated parts transversal to the elongation direction E of the handle arm when the handle arm is in the unfolded position. The resilient element 310 comprises first 1210 and second 1220 leaf springs attached to one of the first and second elongated parts. The leaf springs are arranged to rest against opposite sides of the other of the first and second elongated parts when the handle arm is in the unfolded position. A threaded member 1230 may be attached to each leaf spring and configured to extend through the first and second elongated parts 120, 140. The leaf springs provide a function similar to that of the helical spring in resisting pivoting by the first and second elongated parts about the joint. Thus, as the handle arm 300 bends, one of the leaf springs is flexed (which generates a force F1 or F2 in response to the bending) or extended (which generates a force F2 in response). This way pivoting of the first and second part is resisted.

Note the optional slot 670 shown in FIG. 12, which allows the leaf spring arrangement to be slided in order to engage the second elongated part 140 to hold the handle arm in the unfolded position.

Figure 17:
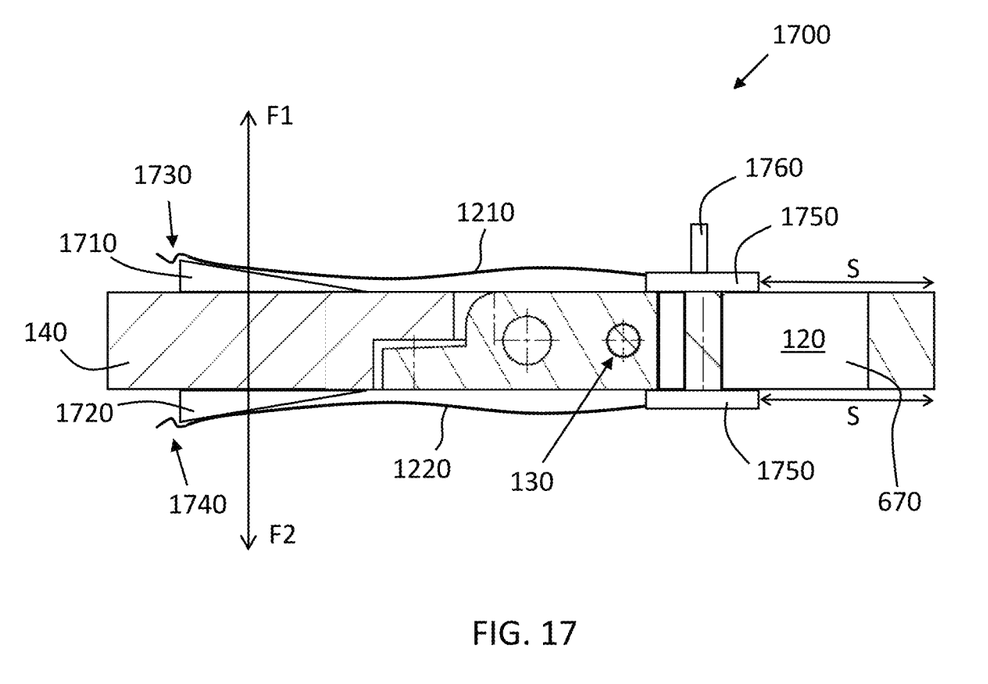
FIG. 17 shows an example vibration reducing arrangement.

FIG. 17 schematically illustrates aspects of a leaf spring arrangement similar to that shown in FIG. 12. However, here the resilient element comprises a snap-lock mechanism arranged to hold the leaf springs in position when the handle is in the unfolded position. To engage the resilient element, the leaf spring arrangement is slided in direction S such that the leaf springs 1210, 1220 traverse onto the ridges 1710, 1720 to hold the handle arm in the unfolded position. The leaf springs are formed 1730, 1740 so as to generate a snap-lock mechanism to hold the leaf springs in place using, e.g., the ends of the ridges 1710, 1720. The arrangement also comprises an optional handle 1760 which an operator can use to release the leaf springs from the locking position by pulling the arrangement in direction S away from the joint. The snap-lock mechanism can be designed so as to allow release by hand, or to allow release by means of some release tool. As for the other resilient element arrangements, the leaf springs are arranged to exert a force F1, F2 directed transversal to the elongation direction of the handle arm.

Generally, for examples 1100, 1200, a locking washer may be arranged in between the knob 1150 and the handle arm to prevent an unwanted self-release of the resilient member due to vibration.

Figure 13:
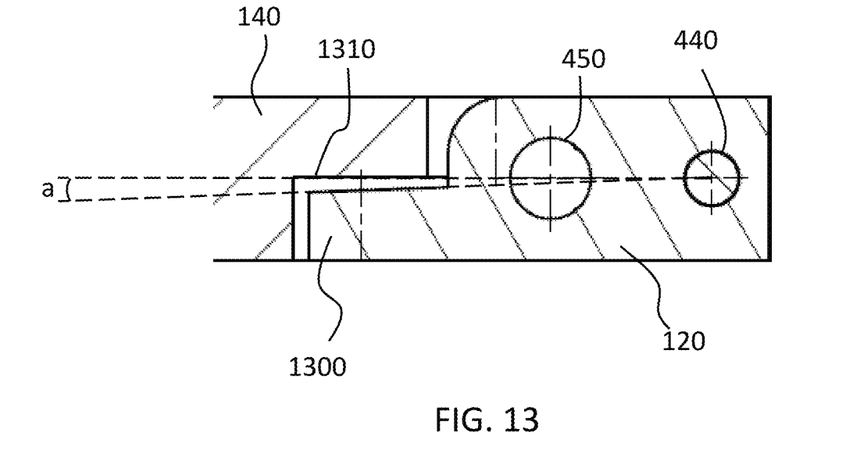
FIG. 13 shows details of a handle joint/hinge.
Figure 14:
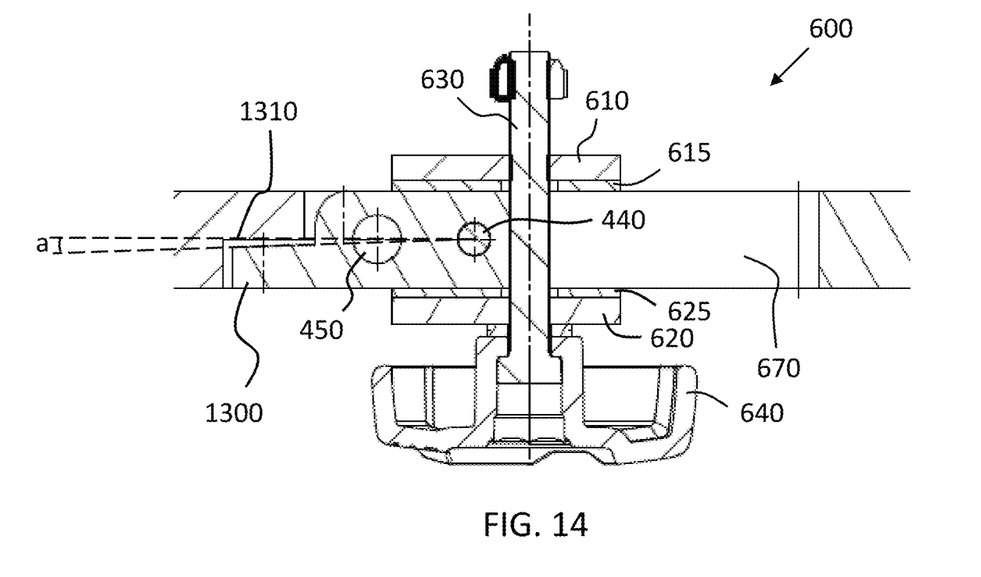
FIG. 14 shows details of an example vibration reducing handle.

FIGS. 13 and 14 show cross-sections of details of the interface between the first and second elongated parts, i.e., where the joint 130 connects the two parts using jaws. The smaller the contact area is between the first and second elongated parts, the less vibration is passed from the machine 150 to the handlebars 110.

However, a rigid mechanical stop connection between first and second parts of the handle arm may be preferred when pressing the handle arm downwards to lift the front part of the machine 150. To provide this mechanical stop contact, according to some aspects, the first elongated part 120 comprises a heel 1300 arranged to abut against an abutment surface 1310 of the second elongated part 140. The heel and abutment surface provide an end-point of the pivoting as the handle arm is pressed downwards D towards a ground surface G (see FIG. 1).

To further reduce the contact area between the first and second elongated handle arm parts, the heel 1300 and the abutment surface 1310 are optionally arranged at an angle a with respect to each other, whereby a space is formed between the heel 1300 and the abutment surface 1310 when the handle arm is resting in the unfolded position.

The heel 1300 and abutment surface 1310 may be used with advantage together with the resilient member 600 from FIGS. 6-10, as shown in FIG. 14.

Figure 15:
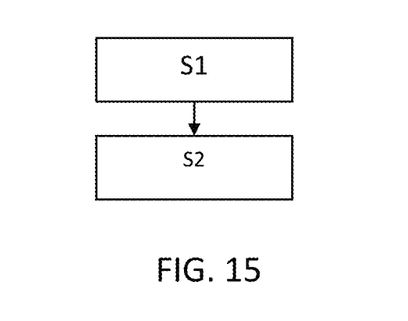
FIG. 15 is a flow chart illustrating methods.

FIG. 15 is a flow chart illustrating a method of modifying a handle arm 300, 600 for an early entry concrete saw 100. The handle arm comprises a joint 130 separating the handle arm into a first elongated part 120 and a second elongated part 140 such as discussed above in connection to FIG. 3. The first part 120 has an elongation direction E1 configured to align with an elongation direction E2 of the second part 140 and an elongation direction E of the handle arm when the handle arm 300, 500, 600 is in an unfolded position.

The method comprises machining S1 a slot 670 in one of the first 120 and second 140 elongated parts, and arranging S2 first 610 and second 620 opposing jaws arranged to clamp against opposite sides of the handle arm 300, 500, 600, and to extend on either side of the joint 130 in the elongation direction E of the handle arm, wherein at least one of the jaws 610, 620 comprises a resilient layer 615, 625 arranged to face the handle arm.

This type of vibration suppressing arrangement was discussed above, e.g., in connection to, e.g., FIG. 14.

FIG. 15 also illustrates a method of modifying a handle arm 300, 600 for an early entry concrete saw 100. The handle arm comprises a joint 130 separating the handle arm into a first elongated part 120 and a second elongated part 140 such as discussed above in connection to FIG. 3. The first part 120 has an elongation direction E1 configured to align with an elongation direction E2 of the second part 140 and an elongation direction E of the handle arm when the handle arm 300, 500, 600 is in an unfolded position.

The method comprises machining S1 a slot 670 in one of the first 120 and second 140 elongated parts, and arranging S2 first 1210 and second 1220 leaf springs slidably S in the slot, whereby the leaf springs are attached to one of the first and second elongated parts and arranged to rest against opposite sides of the other of the first and second elongated parts when the handle is in the extended position.

This vibration suppressing arrangement was discussed above, e.g., in connection to FIG. 17.

The invention chimed is:

1. A vibration suppressing handle arm for an early entry concrete saw, the handle arm comprising:
   a first elongated part comprising a slot;
   a second elongated part;
   a joint, the first elongated part being pivotally secured to the second elongated part by the joint, wherein a lengthwise direction of the first elongated part aligns with a lengthwise direction of the second elongated part to align with a lengthwise direction of the handle arm when the handle arm is in an unfolded position,
   a resilient element comprising first and second opposing jaws configured to clamp onto the handle arm, the resilient element being slideable between a first position and a second position; and
   a pin coupled to the resilient element such that the pin slides with the resilient element, the pin being configured to extend into the slot and slide within the slot when the resilient element is released from clamping onto the handle arm,
   wherein the resilient element is configured to be positioned, with the pin in the slot, in the first position where the first and second opposing jaws clamp over the joint and onto the first elongated part and the second elongated part to maintain the handle arm in the unfolded position and resist, but not prevent, all pivoting about the joint due to forces directed transversal to the lengthwise direction of the handle arm;
   wherein, by resisting but not preventing all pivoting between the first elongated part and the second elongated part, the resilient element reduces a transmission of vibrations between first elongated part and the second elongated part when clamped on the handle arm in the first position; and
   wherein the resilient element is configured to be positioned, with the pin in the slot, in the second position where the first and second opposing jaws engage over the first elongated part but not the second elongated part such that the resilient element does not inhibit the first elongated part from being folded, via the joint, relative to the second elongated part.

2. The handle arm according to claim 1, wherein the first and second elongated parts are at least partly overlapping in the lengthwise direction of the handle arm when the handle arm is in the unfolded position.

3. The handle arm according to claim 1, wherein the joint comprises a shaft arranged in a through-hole extending through end portions of the first and second elongated parts.

4. The handle arm according to claim 1, wherein the joint is located in a middle section of the handle arm, the middle section extending up to one third of the total handle length and centered on the handle arm in the lengthwise direction of the handle.

5. The handle arm according to claim 1, wherein the first elongated part comprises a heel arranged to abut against an abutment surface of the second elongated part, whereby the heel and abutment surface provides an end-point of the pivoting as the handle is pressed downwards towards a ground surface.

6. The handle arm according to claim 5, wherein the heel and the abutment surface are arranged at an angle with respect to each other, whereby a space is formed between the heel and the abutment surface when the handle is resting in the unfolded position.

7. The handle arm according to claim 1, wherein at least one of the opposing jaws comprises a resilient layer arranged to face a surface of the handle arm.

8. The handle arm according to claim 1, wherein the resilient element is arranged to be released by a knob or wingnut; and wherein the pin comprises a threaded member that extends through the first and second opposing jaws and through the slot.

9. The handle arm according to claim 1, wherein the slot extends in the lengthwise direction of the first elongated part.

10. The handle arm according to claim 1, wherein, in the first position, the first opposing jaw contacts the first and second elongated parts in a common plane.

11. The handle arm according to claim 1, wherein the first elongated part remains indirectly coupled to the slot via the pin.

12. A method of modifying a handle arm for an early entry concrete saw, the handle arm comprising a first elongated part, a second elongated part, a resilient element, a pin, and a joint that pivotally secures the first elongated part to the second elongated part, wherein a lengthwise direction of the first elongated part aligns with a lengthwise direction of the second elongated part and a lengthwise direction of the handle arm when the handle arm is in an unfolded position, the method comprising:
   machining a slot in the first elongated part;
   arranging the pin to be coupled to the resilient element such that the pin slides within the slot while the resilient element slides between a first position and a second position, the resilient element comprising first and second opposing jaws to clamp against opposite sides of the handle arm, wherein at least one of the first and second opposing jaws comprises a resilient layer arranged to face a surface of the handle arm;

sliding the resilient element, with the pin in the slot, into the first position to clamp the first and second opposing jaws over the joint with the resilient layer engaged with the first elongated part and the second elongated part to thereby maintain the handle arm in the unfolded position and resist, but not prevent, all pivoting about the joint due to an exertion of forces directed transversal to the lengthwise direction of the handle arm; and sliding the resilient element, with the pin in the slot, in the second position where the first and second opposing jaws engage over the first elongated part but not the second elongated part such that the resilient element does not inhibit the first elongated part from being folded, via the joint, relative to the second elongated part.

13. A handle arm comprising:

a first elongated part comprising a slot;

a second elongated part;

a joint between the first elongated part and the second elongated part; and a resilient element coupled to a pin that extends into the slot, the resilient element being configured to slide, with the pin sliding in the slot, between a first position and a second position, the resilient element comprising first and second opposing jaws configured to clamp against the first elongated part or the second elongated part;

wherein the first and second elongated parts are pivotable relative to each other about the joint;

wherein the first elongated part has a first lengthwise direction that aligns with a second lengthwise direction of the second part to align the first lengthwise direction and the second lengthwise direction with a handle arm lengthwise direction when the handle arm is in an unfolded position;

wherein the resilient element is configured to slide, with the pin in the slot, to a first position where the first and second opposing jaws clamp over the joint and onto the first elongated part and the second elongated part to maintain the handle arm in the unfolded position by resisting, but not preventing, all pivoting of the first elongated part relative to the second elongated part about the joint via forces directed transversal to the handle arm lengthwise direction;

wherein the first opposing jaw comprises a resilient layer, the resilient layer being configured to face a surface of the first elongated part and the second elongated part, when the resilient element is in the first position, and deform as the first and second elongated parts pivot relative to each other to resist the forces directed transversal to the handle arm lengthwise direction and reduce transmission of vibrations between the first elongated part and the second elongated part;

wherein the resilient element is configured to slide, with the pin in the slot, to a second position where the first and second opposing jaws engage over the first elongated part but not the second elongated art such that the resilient element does not inhibit the first elongated part from being folded, via the joint, relative to the second elongated part.

\* \* \* \* \*

UNITED STATES PATENT AND TRADEMARK OFFICE
CERTIFICATE OF CORRECTION

| | |
|---|---|
| PATENT NO. | : 11,975,437 B2 |
| APPLICATION NO. | : 17/125016 |
| DATED | : May 7, 2024 |
| INVENTOR(S) | : Johan Sandwall et al. |

It is certified that error appears in the above-identified patent and that said Letters Patent is hereby corrected as shown below:

In the Claims

In Column 11, Claim 1, Line 47, "position," should read -- position; --

In Column 14, Claim 13, Line 29, "second elongated art" should read -- second elongated part --

Signed and Sealed this
Third Day of December, 2024

*Katherine Kelly Vidal*

Katherine Kelly Vidal
*Director of the United States Patent and Trademark Office*